United States Patent [19]

Hidai et al.

[11] Patent Number: 4,769,059
[45] Date of Patent: Sep. 6, 1988

[54] GLASS MELTING FURNACE

[75] Inventors: Tadakazu Hidai; Toshikazu Kondo, both of Osaka, Japan

[73] Assignee: Nippon Sheet Glass Co., Ltd., Osaka, Japan

[21] Appl. No.: 77,798

[22] Filed: Jul. 27, 1987

[30] Foreign Application Priority Data

Jul. 28, 1986 [JP] Japan .................. 61-116525[U]

[51] Int. Cl.⁴ .............................................. C03B 5/20
[52] U.S. Cl. ........................................ 65/325; 65/346; 65/347
[58] Field of Search ................... 65/27, 126, 135, 136, 65/137, 337, 325, 346, 347

[56] References Cited

U.S. PATENT DOCUMENTS 3,251,669  5/1966  Dunipace et al. .............. 65/135 X
3,583,861  6/1971  Preston ........................... 65/136 X

FOREIGN PATENT DOCUMENTS 0125599 12/1967 Czechoslovakia .................. 65/135

Primary Examiner—Arthur Kellogg
Attorney, Agent, or Firm—Bogucki, Scherlacher, Mok & Roth

[57] ABSTRACT

A glass melting furnace includes a furnace body including for storing molten glass, an upstanding tank including a bottom member lying flush with the bottom wall of the furnace body and a rear wall remote from the furnace body, the upstanding tank communicating with the furnace body, a feeder disposed upwardly of the rear wall of the upstanding tank and communicating with the upstanding tank, and a drainage mechanism disposed in a corner defined between the rear wall and bottom member of the upstanding tank for draining out heterogeneous molten glass. The upstanding tank has a width smaller than the width of the furnace body. The drainage mechanism comprises a through hole having an inlet opening into the upstanding tank and an outlet opening at a rear surface of the rear wall, the through hole being tapered from the inlet toward the outlet.

10 Claims, 3 Drawing Sheets

GLASS MELTING FURNACE

BACKGROUND OF THE INVENTION

1. Field of the Invention

The present invention relates to a glass melting furnace for melting constituent materials of glass into molten glass of good quality which will be supplied to a feeder or the like, and more particularly to a drainage mechanism of such a glass melting furnace.

2. Description of the Relevant Art

Glass melting furnaces for melting ingredient materials of glass are generally constructed of refractory bricks. While the molten glass and the refractory bricks are being heated to high temperature in the glass melting furnace, materials of the refractory bricks inevitably melt into the molten glass.

The molten glass which is rendered heterogeneous by the addition of refractory brick materials has a larger specific gravity and a higher viscosity than those of normal molten glass free of refractory brick materials, and also has different characteristics such as a refractive index. If the amount of heterogeneous molten glass is increased, it remains on the bottom of the melting furnace and tends to flow into a feeder or the like which supplies molten glass to a glass shaping mechanism or the like that is located next to the melting furnace.

FIGS. 5 and 6 of the accompanying drawings illustrate conventional glass melting furnaces designed for solving the above problem.

The glass melting furnace shown in FIG. 5 comprises a furnace body 100 for containing molten glass G, a throat 101 extending horizontally from the furnace body 100 and spaced upwardly from the bottom of the furnace body 100, and a feeder (not shown) connected to the throat 101. The bottom of the furnace body 100 has a vertical drain hole 102 defined therethrough for draining out heterogeneous molten glass 103 collected on the bottom of the furnace body 100.

The glass melting furnace of FIG. 6 has a throat 101 lying at the same level as the bottom of a furnace body 100, and a dam 104 disposed on the bottom of the furnace body 100 in front of the inlet of the throat 101. Heterogenous molten glass 103 is drained out of a drain hole 102 defined vertically in the bottom of the furnace body 100.

The heterogeneous molten glass 103 has a greater specific gravity and a higher viscosity than those of normal molten glass. Therefore, when draining out the heterogenenous molten glass from the drain holes as shown in FIGS. 5 and 6, there is a tendency for normal molten glass to flow centrally through the flow of heterogenenous molten glass as indicated in FIG. 7.

More specifically, the molten glass G in the furnace tends to move toward the throat 101, i.e., in a lateral direction F, and so does the heterogeneous molten glass 103. Since the heterogenous molten glass 103 is highly viscous and hence less flowable, it is less liable to flow out of the drain hole 102 due to the lateral force applied in the direction F unless it flows near the drain hole 102. The normal homogeneous molten glass is low in viscosity and more flowable, it can easily flow through the drain hole 102 while being mixed in the stream of the heterogeneous molten glass 103 through the drain hole 102. As a result, the heterogeneous molten glass 103 cannot fully be drained out, but remains to be accumulated on the bottom of the furnace body 100 up to a point where it will flow into the throat 101.

SUMMARY OF THE INVENTION

In view of the aforesaid drawback of the conventional glass melting furnaces, it is an object of the present invention to provide a glass melting furnace capable of draining out heterogeneous molten glass through a drainage mechanism without the danger of letting the same flow into a feeder or the like.

According to the present invention, there is provided a glass melting furnace comprising a furnace body including a plurality of side walls and a bottom wall, for storing molten glass, an upstanding tank including a bottom member lying flush with the bottom wall of the furnace body and a plurality of side walls including a rear wall remote from the furnace body, the upstanding tank communicating with the furnace body, a feeder disposed upwardly of the rear wall of the upstanding tank and communicating with the upstanding tank, and a drainage mechanism disposed in a corner defined between the rear wall and bottom member of the upstanding tank for draining out heterogeneous molten glass. Preferably, the upstanding tank has a width smaller than the width of the furnace body.

The drainage mechanism comprises a through hole having an inlet opening into the upstanding tank and an outlet opening at a rear surface of the rear wall, the through hole being tapered from the inlet toward the outlet.

The glass melting furnace further includes a ceiling member disposed above and covering the furnace body, the upstanding tank, and the feeder, and a block extending downwardly from the ceiling member above an area where the upstanding tank and the furnace body are joined, the block separating the upstanding tank from the furnace body and defining a throat between the block and the bottom member, the furnace body and the upstanding tank communicating with each other through the throat.

The inlet of the through hole has a width which is at least ½ of an inside width of the upstanding tank.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
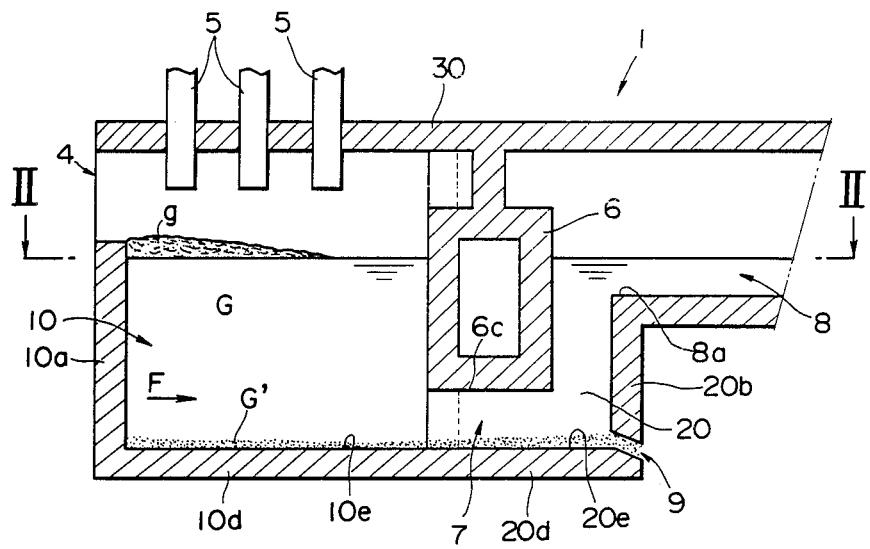
FIG. 1 is a vertical cross-sectional view of a glass melting furnace according to a first embodiment of the present invention.

Like or corresponding parts are denoted by like or corresponding reference numerals throughout the views.

Figure 2:
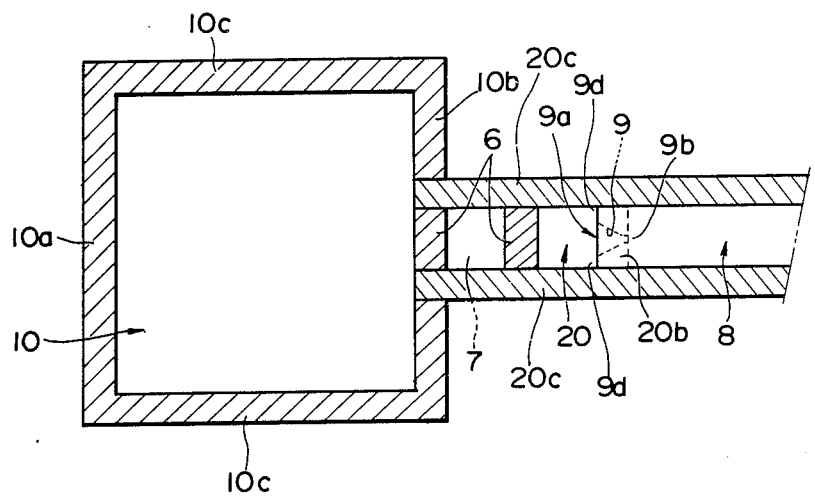
FIG. 2 is a cross-sectional view taken along line II—II of FIG. 1.

FIGS. 1 and 2 show a glass melting furnace according to a first embodiment of the present invention. The glass melting furnace, generally designated by the reference numeral 1, comprises a furnace body 10 for storing molten glass G therein, an upstanding tank 20 narrower than the furnace body 10 and connected thereto with its bottom lying flush with the bottom of the furnace body 10, and a ceiling member 30 covering the upper ends of the furnace body 10 and the upstanding tank 20. The horizontal dimension or width of the upstanding tank 20 is smaller than the horizontal dimension or width of the furnace body 10.

The furnace body 10 includes a front wall 10a having a charging slot 4 for charging constituent materials of glass therethrough into the furnace body 10. The ceiling member 3 above the furnace body 10 supports a plurality of gas burners 5 for melting the glass constituent materials G supplied through the charging slot 4 onto the upper surface of the molten glass G and keeping the interior of the furnace body 10 at a high temperature. A block 6 depends into the upstanding tank 20 from that ceiling member 3 where the upstanding tank 20 and the furnace body 10 are joined to each other. The block 6 divides the space above the upper surface of the molten glass G and an upper layer of the molten glass G itself into a portion in the furnace body 10 and a portion in the upstanding tank 20.

More specifically, the block 6 terminates short of a bottom surface 20e of a bottom member 20d of the upstanding tank 20, leaving a space therebelow for allowing the molten glass G to flow between the furnace body 10 and the upstanding tank 20. Such a space serves as a throat 7 defined between the lower surface 6c of the block 6 and the bottom surface 20e of the upstanding tank 20 for allowing passage of the molten glass G therethrough.

The upstanding tank 20 includes a rear wall 20b having an inlet step 8a on its upper surface which extends substantially horizontally below the suface level of the molten glass G. The inlet step 8a serves as a feeder 8 for introducing a top layer of the molten glass G in the upstanding tank 20 and supplying the introduced top layer to a glass shaping mechanism (not shown) which follows the glass melting furnace 1. The feeder 8 and the glass shaping mechanism are thus positioned downstream of the furnace body 10 in the direction in which the molten glass G flows from the furnace body 10.

Various walls of the glass melting furnace 10, including side walls such as the front wall, a rear wall 10b, lateral side walls 10c, and a bottom wall 10d of the furnace body 10, side walls such as lateral side walls 20c, the rear wall 20b, the bottom member 20d of the upstanding tank 20, the ceiling member 30, the block 6, and the feeder 8, are all made of refractory bricks, etc.

A drainage mechanism 9 is disposed at a lower portion of the rear wall 20b of the upstanding tank 20, i.e., at a corner defined by the rear wall 20b and the bottom surface 20e of the bottom member 20d which lies at the same level as that of the bottom surface 10e of the bottom wall 10d. The drainage mechanism 9 comprises a through hole joining an inlet 9a (FIG. 2) opening at the corner and an outlet 9b opening at the outer surface of the rear wall 20b of the upstanding tank 20. The through hole 9 is inclined downwardly from the inlet 9a toward the outlet 9b, and is of a tapered shape with its cross-sectional area progressively reduced from the inlet 9a toward the outlet 9b, as shown in FIG. 2.

The molten glass G in the furnace body 10 moves horizontallly in a lateral direction F throught the throat 7 into the upstanding tank 20. Heterogeneous molten glass G' having a larger specific gravity does not rise in the upstanding tank 20, but flows along the bottom surface 20e into the drainage hole 9 from which the heterogeneous molten glass G' is gradually discharged out by gravity. The normal homogeneous molten glass rises in the upstanding tank 20 and flows into the feeder 8.

The shape of the through hole 9 of the drainage mechanism, as viewed in plan, is wider at the inlet 9a and progressively narrower toward the outlet 9b. Dead corners 9d on opposite sides of the inlet 9a are made as small as possible, as shown in FIG. 2. If these dead corners 9d were larger, the heterogeneous molten glass G' would be trapped thereby and become stagnant, causing the heterogeneous molten glass G' to start rising up the upstanding tank 20. It is preferable for the horizontal width of the inlet 9a of the the through hole 9 to be ½ or more of the horizontal inside width of the upstanding tank 20. Since the layer of the heterogeneous molten glass G' is generally thin, if the vertical width or height of the through hole 9 were excessively large, a large quantity of normal molten glass would also be introduced into the through hole 9. Therefore, the vertical dimension of the through hole 9 should be designed dependent on the thickness of the layer of the heterogeneous molten glass G'. The heterogeneous molten glass G' can substantially fully be discharged by the drainage mechanism 9 without carrying the normal molten glass therewith.

Figure 3:
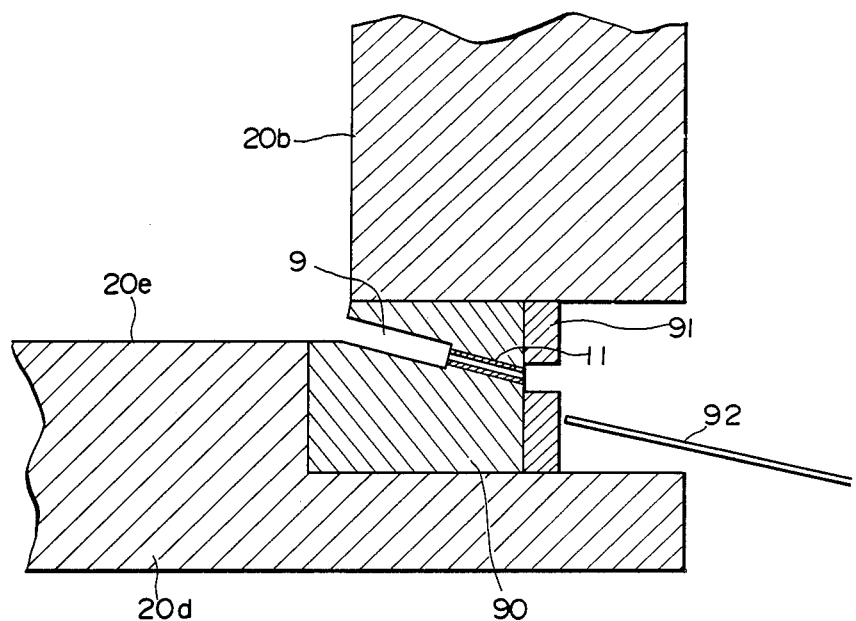
FIG. 3 is an enlarged fragmentary cross-sectional view of a modified drainage mechanism.

FIG. 3 shows a modification in which a pipe 11 of platinum is fitted in th rear portion of the through hole 9 and electrically connected to an electric power supply (not shown). In operation, an electric current is passed through the pipe 11 to vary the viscosity of the heterogeneous molten glass G' that flows through the through hole 9, so that the rate of flow of the heterogeneous molten glass G' may be regulated.

In FIG. 3, the drainage mechainsm or the through hole 9 is defined in a block 90 in the form of a refractory brick separate from the glass melting furnace 1. The block 90 is fitted in a hole defined in the corner between the rear wall 20b and bottom member 20d of the upstanding tank 20, and is reinforced with a seal member 91. The heterogenenous molten glass discharged by the drainage mechanism 9 is guided by a trough 92 toward a desired area.

Figure 4:
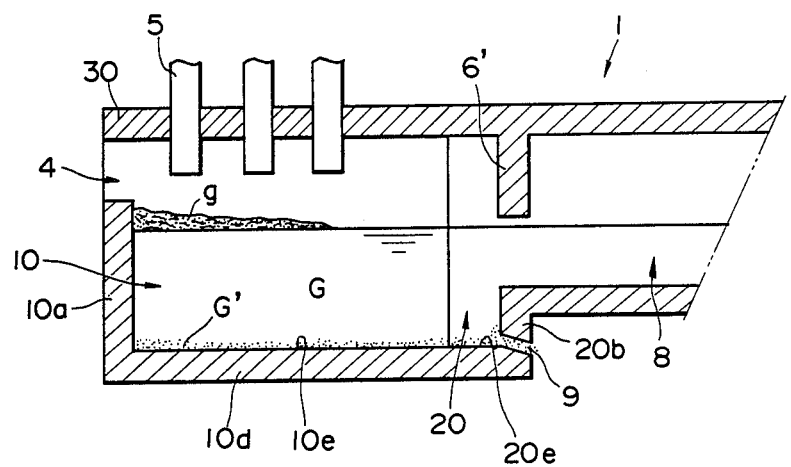
FIG. 4 is a vertical cross-sectional view of a glass melting furnace according to a second embodiment of the present invention.
Figure 5:
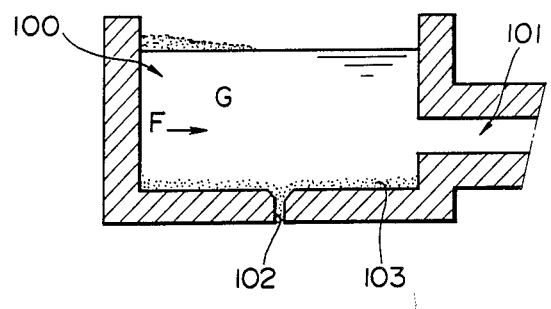
FIG. 5 is a vertical cross-sectional view of a conventional glass melting furnace.
Figure 6:
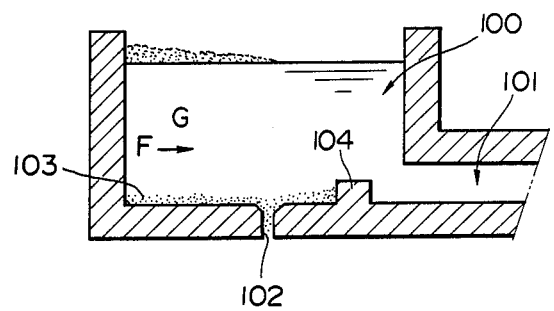
FIG. 6 is a vertical cross-sectional view of another conventional glass melting furnace.
Figure 7:
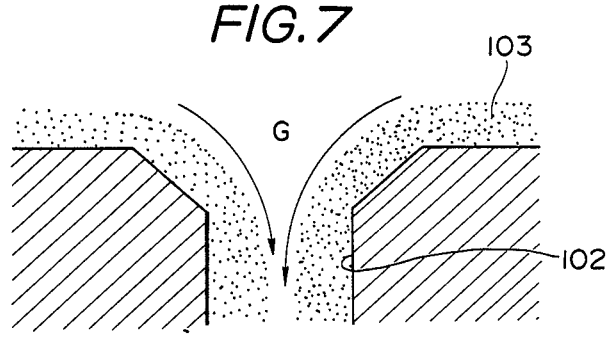
FIG. 7 is an enlarged fragmentary cross-sectional view showing molten glass flows in the vinicity of a drain hole in the glass melting furnaces shown in FIGS. 5 and 6.

FIG. 4 shows a glass melting furnace 1 according to a second embodiment of the present invention. The second embodiment differs from the first embodiment in that the furnace body 10 and the upstanding tank 20 are not divided from each other. However, a shield block 6' extends downwardly from the ceiling member 30 above the rear wall 20b between the upstanding tank 20 and the feeder 8 and terminates immediately short of the upper surface of molten glass G. The shield block 6' separates the atmosphere above the molten glass G in the furnace body 10 and the upstanding tank 20 from the atmosphere above the molten glass G in the feeder 8. Preferably, the horizontal dimension or width of the upstanding tank 20 should be smaller than the horizontal dimension or width of the furnace body 10.

A drainage mechanism 9 in the second embodiment is a through hole defined through the corner between the lower portion of the rear wall 20b and the bottom member 20d of the upstanding tank 20 and inclined downwardly from the inlet opening at the inner surface of the corner and the outlet opening at the outer surface of the rear wall 20b. The through hole 9 is of a tapered configuration with its inlet wider and its outlet narrower. Where the width of the upstanding tank 20 is relatively large with respect to the width of the furnace body 10, i.e., where the width of the glass melting furnace 1 is not reduced greatly on transition from the furnace body 10 to the upstanding tank 20 as shown in FIG. 2, the heterogeneous molten glass G' would not efficiently be discharged if the width of the inlet of the through hole 9 were large with respect to the width of the upstanding tank 20. In this case, therefore, the width of the inlet of the drainage hole 9 should be relatively large. In case the inlet of the drainage hole 9 cannot be increased in width in view of the required mechanical strength of the furnace, a plurality of parallel smaller through holes may be defined through the corner between the rear wall 20b and the bottom member 20d.

In the glass melting furnace 1 shown in FIG. 4, the heterogeneous molten glass G' of higher specific gravity is accumulated on the bottom of the furnace body 10 and flows downstream (to the right in FIG. 4) along the bottom surfaces 10e, 20e toward the corner between the rear wall 20b and the bottom member 20d when normal molten glass flows. The heterogeneous molten glass G' that has reached the corner is smoothly introdced into the drainage mechanism 9 without greatly changing its direction of flow, and is discharged out of the drainage mechanism 9.

The glass melting furnace described in the above embodiments is of the hot-top type in which the gas burners 5 are mounted on the ceiling member of the furnace. However, the drainage mechanism of the present invention may be incorporated in a furnace of the cold-top type in which electrode rods are used in place of the gas burners.

With the arrangement of the present invention, heterogeneous molten glass which tends to flow toward the rear corner of the furnace is discharged out of the furnace through the drainage mechanism provided in the rear corner without brnging about a large change in the flow of the heterogeneous molten glass. The possibility of normal homogeneous molten glass getting discharged with the heterogeneous molten glass is greately reduced.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A glass melting furnace comprising:
    a furnace body including a rear wall, a plurality of spaced apart side walls defining a width therebetween and a bottom wall;
    an upstanding tank in communication with said furnace body, including a bottom member lying flush with the bottom wall of said furnace body and a plurality of spaced apart side walls defining a width therebetween including a rear wall remote from said furnace body;
    a feeder disposed at the rear wall of the upstanding tank and communicating with said upstanding tank for introducing and discharging molten glass from the furnace; and
    a drainage conduit disposed at a location adjacent said rear wall and bottom member of the upstanding tank for draining out heterogeneous molten glass, the conduit having an inlet opening into said upstanding tank and an outlet opening at a rear surface of said rear wall, the conduit being tapered such that the cross-sectional area of the inlet is greater than the cross-sectional area of the outlet.

2. A glass melting furnace according to claim 1, wherein said upstanding tank has a width smaller than the width of said furnace body.

3. A glass melting furnace according to claim 1, wherein said conduit comprises a plurality of conduits.

4. A glass melting furnace according to claim 1, wherein the side walls of the upstanding tank join to the rear wall of the furnace body so as to define a passageway for molten glass flowing from the furnace body to the upstanding tank and further including a ceiling member disposed above and covering said furnace body, said upstanding tank, and said feeder, and a block extending downwardly into the passageway from said ceiling member from above a location where said upstanding tank and said furnace body join.

5. A glass melting furnace according to claim 4, wherein said inlet of the conduit has a width which is at least ½ of the width of said upstanding tank.

6. A glass melting furnace according to claim 1, further including a ceiling member disposed above and covering said furnace body, said upstanding tank, and said feeder, and a shield block extending downwardly from said ceiling member above an area where said upstanding tank and said feeder communicate, said shield block extending downward to a location near an upper surface of the molten glass.

7. A glass melting furnace according to claim 6, wherein said conduit comprises a plurality of conduits.

8. A glass melting furnace according to claim 7, wherein said upstanding tank has a width less than the width of said furnace body.

9. A glass melting furnace according to claim 7, wherein a downstream portion of the conduit is formed of electrically conductive material and further includes means for coupling the conduit to a source of electrical energy.

10. A glass melting furnace according to claim 9 wherein the eletrically conductive material is platinum.

* * * * *